United States Patent
Al-Akhdar et al.

(10) Patent No.: US 7,531,487 B2
(45) Date of Patent: May 12, 2009

(54) LUBRICATING OIL COMPOSITIONS WITH IMPROVED PERFORMANCE

(76) Inventors: Walid Al-Akhdar, 11 Old Hayrake Rd., Danbury, CT (US) 06811; Laura F. Chafin, Via Pila 6/3, 40044 Dsddo Marconi (BO), Fraz. Pontecchio Marconi (IT); David Chasan, 1100 Windsor Rd., Teaneck, NJ (US) 07666

( * ) Notice: Subject to any disclaimer, the term of this patent is extended or adjusted under 35 U.S.C. 154(b) by 662 days.

(21) Appl. No.: 11/201,389

(22) Filed: Aug. 10, 2005

(65) Prior Publication Data

US 2006/0040833 A1 Feb. 23, 2006

Related U.S. Application Data

(60) Provisional application No. 60/602,593, filed on Aug. 18, 2004.

(51) Int. Cl.
C10L 1/14 (2006.01)
(52) U.S. Cl. ...................................................... 508/459
(58) Field of Classification Search .................. 508/459
See application file for complete search history.

(56) References Cited

U.S. PATENT DOCUMENTS

| | | | |
|---|---|---|---|
| 3,285,855 A | 11/1966 | Dexter et al. | 252/57 |
| 3,330,859 A | 7/1967 | Dexter et al. | 260/473 |
| 3,637,585 A | 1/1972 | Beirne | 260/45.85 |
| 4,659,863 A | 4/1987 | Burton | 560/75 |
| 5,198,130 A | 3/1993 | Schumacher | 252/32.7 |
| 5,478,875 A | 12/1995 | Dubs et al. | 524/291 |
| 5,523,007 A | 6/1996 | Kristen et al. | 252/32.7 |
| 5,688,748 A | 11/1997 | Tomizawa | 508/363 |
| 5,711,767 A | 1/1998 | Gande et al. | 44/423 |
| 5,744,430 A | 4/1998 | Inoue et al. | 508/295 |
| 5,840,672 A | 11/1998 | Gatto | 508/334 |
| 6,096,695 A | 8/2000 | Lam et al. | 508/570 |
| 6,656,887 B2 | 12/2003 | Yagishita et al. | 508/371 |
| 2003/0182849 A1 | 10/2003 | Blahey et al. | 44/450 |
| 2003/0216266 A1 | 11/2003 | Hirano et al. | 508/291 |
| 2004/0242434 A1 | 12/2004 | Yagishita et al. | 508/291 |
| 2005/0192455 A1* | 9/2005 | Gatto et al. | 560/130 |

FOREIGN PATENT DOCUMENTS

| | | |
|---|---|---|
| GB | 1314714 | 4/1973 |
| GB | 2325472 | 11/1998 |
| WO | WO2004/003117 | 1/2004 |

OTHER PUBLICATIONS

English language abstract for JP 2004035619, Publication Date: Feb. 5, 2004.
English language abstract for JP 2004067808, Publication Date: Mar. 4, 2004.
English language abstract for JP 2003183686, Publication Date: Jul. 3, 2003.
English language abstract for JP 2004083746, Publication Date: Mar. 18, 2004.
English language absract for JP 2002206096, Publication Date: Jul. 26, 2002.
English language abstract for JP 2003336089, Publication Date: Nov. 28, 2003.
T. F. Titova et al., Zhurnal Organicheskoi Khimii, (Sep. 1984), vol. 20, No. 9, pp. 1899-1905.

* cited by examiner

*Primary Examiner*—Walter D Griffin
*Assistant Examiner*—Frank C Campanell
(74) *Attorney, Agent, or Firm*—Tyler A. Stevenson

(57) ABSTRACT

Disclosed are stabilized lubricating oil compositions with improved oxidative performance. These lubricating oil compositions contain certain phenolic antioxidants, in combination with other antioxidants, which contribute to the improved performance. These certain phenolic antioxidants are defined in formula (I),

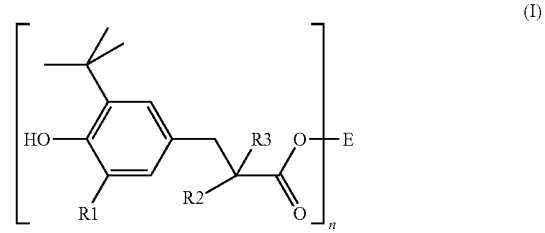

wherein, R1 is alkyl of 1 to 4 carbon atoms, n is 1 to 4, R2 is H or R3, R3 is —(CH2)$_x$—COOR4 where x is 1 to 10, R4 is straight or branched chain alkyl of 1 to 24 carbon atoms or E, when n is 1, E is straight or branched chain alkyl of 1 to 24 carbon atoms;

when n is 2, E is straight or branched chain alkylene of 2 to 12 carbon atoms or said alkylene interrupted by one to five O or S atoms;

when n is 3, E is a straight or branched chain alkanetriyl of 3 to 6 carbon atoms; and when n is 4, E is pentaerthrityl.

13 Claims, No Drawings

LUBRICATING OIL COMPOSITIONS WITH IMPROVED PERFORMANCE

This application claims benefit under 35 USC 119(e) of U.S. provisional application No. 60/602,593, filed Aug. 18, 2004, the disclosure of which is hereby incorporated by reference.

The present invention is aimed at lubricating oil compositions with improved oxidative performance.

U.S. Pat. No. 5,523,007 discloses a diesel engine oil composition comprising a phenolic antioxidant.

U.S. Pat. No. 5,840,672, and EP 811,631 disclose antioxidant systems for lubrication base oils.

U.S. Pat. No. 5,198,130 discloses lubricant compositions essentially free of barium salts which optionally comprise antioxidants.

U.S. Pat. No. 5,478,875 and GB 2,325,472 disclose liquid multifunctional antioxidants useful for the stabilization of polymers and lubricants.

JP 2004035619, JP 2004067808, and JP 2003183686 disclose lubricating oil compositions comprising phosphorus compounds, alkali or alkaline earth metal detergents, ashless dispersants and phenolic or amine-type antioxidants.

JP 2004083746 discloses lubricating oil compositions comprising organic boric acid esters, metallic detergents, ashless dispersants, and phenolic or amine-type antioxidants.

U.S. Pat. No. 3,285,855, GB 1,314,714, and U.S. Pat. No. 3,330,859 disclose antioxidant compounds and compositions stabilized therewith.

U.S. Pat. No. 6,656,887 discloses lubricating oil compositions comprising certain phosphorus compounds and phenolic antioxidants.

WO 2004/003117 discloses a lubricating oil composition comprising phenolic antioxidants among other things.

JP 2002206096, WO 2003/033629, U.S. Pat. No. 5,688,748, and WO 2003/008522 disclose lubricant compositions for internal combustion engines comprising phenolic antioxidants among other things.

JP 2002148224 and EP 1361263 disclose lubricating oil compositions comprising phenolic antioxidants among other things.

WO 2000/22070 discloses a long life gas engine oil and additive system comprising a minor amount of phenolic antioxidants.

U.S. Pat. No. 5,711,767 discloses stabilizer systems for the prevention of gum formation in gasoline comprising phenolic antioxidants.

Titova, T. F. et al in *Zhurnal Organicheskoi Khimii* 1984, 20(9), 1899-905 disclose the synthesis of dimethyl alpha-(3,5-di-tert-butyl-4-hydroxylbenzyl)glutarate.

It has surprisingly been found that lubricating oil compositions containing certain antioxidants display improved oxidative performance.

DETAILED DESCRIPTION

The present invention relates to a lubricating oil composition with improved oxidative performance, said composition comprising a) one or more hindered phenol antioxidant compounds of formula (I),

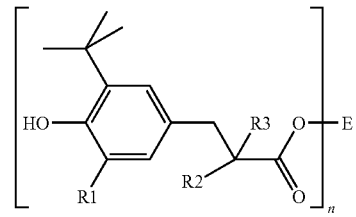

b) one or more further antioxidant compounds, and
c) a base fluid, wherein the percent by weight of component a) to the total weight of component a) plus component b) is about 0.001 percent to about 99.999 percent, where
R1 is alkyl of 1 to 4 carbon atoms,
n is 1 to 4,
R2 is H or R3,
R3 is —(CH2)$_x$—COOR4 where x is 1 to 10,
R4 is straight or branched chain alkyl of 1 to 24 carbon atoms or E,
when n is 1, E is straight or branched chain alkyl of 1 to 24 carbon atoms;
when n is 2, E is straight or branched chain alkylene of 2 to 12 carbon atoms or said alkylene interrupted by one to five O or S atoms;
when n is 3, E is a straight or branched chain alkanetriyl of 3 to 6 carbon atoms; and
when n is 4, E is pentaerthyrityl.

Alkyl is straight or branched chain and is for example methyl, ethyl, n-propyl, iso-propyl, n-butyl, isobutyl, sec-butyl, t-butyl, n-pentyl, isopentyl, n-hexyl, n-heptyl, 3-heptyl, n-octyl, 2-ethylhexyl, n-nonyl, n-decyl, undecyl, n-dodecyl, tridecyl, n-tetradecyl, pentadecyl, n-hexadecyl, n-octadecyl, n-eicosyl, heptadecyl, 2-ethylbutyl, 1-methylpentyl, 1,3-dimethylbutyl, 1,1,3,3-tetramethylbutyl, 1-methylhexyl, isoheptyl, 1-methylheptyl, 1,1,3-trimethylhexyl, and 1-methylundecyl.

Specific compounds of component a) formula (I) include:
dimethyl alpha-(3,5-di-tert-butyl-4-hydroxylbenzyl)glutarate,
diisooctyl alpha-(3,5-di-tert-butyl-4-hydroxylbenzyl)glutarate, and
monomethyl-monoisooctyl alpha-(3,5-di-tert-butyl-4-hydroxylbenzyl)glutarate.

The antioxidant compounds of component b) in the compositions of the present invention are phenolic antioxidants.

The antioxidant compounds of component b) in the compositions of the present invention may for example be:
n-octadecyl 3,5-di-tert-butyl-4-hydroxyhydrocinnamate,
isooctyl 3,5-di-tert-butyl-4-hydroxyhydrocinnamate,
neopentanetetrayl tetrakis(3,5-di-tert-butyl-4-hydroxyhydrocinammate),
1,3,5-tris(3,5-di-tert-butyl-4-hydroxybenzyl)isocyanurate,
thiodiethylene bis(3,5-di-tert-butyl-4-hydroxyhydrocinnamate),
1,3,5-trimethyl-2,4,6-tris(3,5-di-tert-butyl-4-hydroxybenzyl)benzene,
3,6-dioxaoctamethylene bis(3-methyl-5-tert-butyl-4-hydroxyhydrocinnamate),
2,6-di-tert-butyl-p-cresol, 2,2'-ethylidene-bis(4,6-di-tert-butylphenol),
1,3,5-tris(2,6-dimethyl-4-tert-butyl-3-hydroxybenzyl) isocyanurate,
1,1,3,-tris(2-methyl-4-hydroxy-5-tert-butylphenyl)butane,
1,3,5-tris[2-(3,5-di-tert-butyl-4-hydroxyhydrocinnamoyloxy)ethyl] isocyanurate,
3,5-di-(3,5-di-tert-butyl-4-hydroxybenzyl)mesitol,
hexamethylene bis(3,5-di-tert-butyl-4-hydroxyhydrocinnamate),
1-(3,5-di-tert-butyl-4-hydroxyanilino)-3,5-di(octylthio)-s-triazine,
N,N'-hexamethylene-bis(3,5-di-tert-butyl-4-hydroxyhydrocinnamamide),
calcium bis(ethyl 3,5-di-tert-butyl-4-hydroxybenzylphosphonate),
ethylene bis[3,3-di(3-tert-butyl-4-hydroxyphenyl)butyrate],
octyl 3,5-di-tert-butyl-4-hydroxybenzylmercaptoacetate,
bis(3,5-di-tert-butyl-4-hydroxyhydrocinnamoyl)hydrazide,
N,N'-bis[2-(3,5-di-tert-butyl-4-hydroxyhydrocinnamoyloxy)-ethyl]oxamide,
2,6-di-tert-butylphenol,
2,4-di-tert-butylphenol,
methyl 3,5-di-tert-butyl-4-hydroxyhydrocinnamate,
pentaerythritol tris(3,5-di-tert-butyl-4-hydroxyhydrocinnimate),
pentaerythritol di(3,5-di-tert-butyl-4-hydroxyhydrocinnimate),
tris(2,4-di-tert-butylphenyl) phosphite,
di-n-octadecyl 3,5-di-tert-butyl-4-hydroxybenzylphosphonate,
N,N-di-($C_{14}$-$C_{24}$alkyl)-N-methylamine oxide,
N,N,-dialkylhydroxylamine, or
N,N-di(hydrogenated tallow)hydroxylamine.

The antioxidant compounds of component b) in the compositions of the present invention may for example be:
n-octadecyl 3,5-di-tert-butyl-4-hydroxyhydrocinnamate,
isooctyl 3,5-di-tert-butyl-4-hydroxyhydrocinnamate,
neopentanetetrayl tetrakis(3,5-di-tert-butyl-4-hydroxyhydrocinammate),
thiodiethylene bis(3,5-di-tert-butyl-4-hydroxyhydrocinnamate),
2,2'-ethylidene-bis(4,6-di-tert-butylphenol),
1,1,3,-tris(2-methyl-4-hydroxy-5-tert-butylphenyl)butane,
hexamethylene bis(3,5-di-tert-butyl-4-hydroxyhydrocinnamate),
N,N'-hexamethylene-bis(3,5-di-tert-butyl-4-hydroxyhydrocinnamamide),
ethylene bis[3,3-di(3-tert-butyl-4-hydroxyphenyl)butyrate],
bis(3,5-di-tert-butyl-4-hydroxyhydrocinnamoyl)hydrazide,
2,6-di-tert-butylphenol,
2,4-di-tert-butylphenol,
methyl 3,5-di-tert-butyl-4-hydroxyhydrocinnamate,
pentaerythritol tris(3,5-di-tert-butyl-4-hydroxyhydrocinnimate),
pentaerythritol di(3,5-di-tert-butyl-4-hydroxyhydrocinnimate), or
tris(2,4-di-tert-butylphenyl) phosphite.

The antioxidants of component b) in the compositions of the present invention may for example be:
n-octadecyl 3,5-di-tert-butyl-4-hydroxyhydrocinnamate,
isooctyl 3,5-di-tert-butyl-4-hydroxyhydrocinnamate,
neopentanetetrayl tetrakis(3,5-di-tert-butyl-4-hydroxyhydrocinammate),
thiodiethylene bis(3,5-di-tert-butyl-4-hydroxyhydrocinnamate),
2,6-di-tert-butylphenol,
2,4-di-tert-butylphenol,
methyl 3,5-di-tert-butyl-4-hydroxyhydrocinnamate,
pentaerythritol tris(3,5-di-tert-butyl-4-hydroxyhydrocinnimate),
pentaerythritol di(3,5-di-tert-butyl-4-hydroxyhydrocinnimate), or
tris(2,4-di-tert-butylphenyl) phosphite.

The base fluids in component c) in accordance with the invention utilize mineral oil based fluids (API Group I, II and III), lubricating oil basestock, poly-alpha-olefins—PAOs (API Group IV), esters (API Group V), other synthetic fluids, natural oils that are animal or vegetable in origin, and mixtures thereof. The base fluids are of suitable viscosity for utilization in engine oil applications.

It is contemplated that the instant compositions are useful in lubricating oils. The present lubricating oils are for example those employed in internal combustion engines. The present oils have necessary lubricating viscosity. The oils are for example mineral oils or are synthetic and mixtures thereof.

The lubricating oil basestock can be derived from natural lubricating oils, synthetic lubricating oils or mixtures thereof. Suitable lubricating oil basestocks obtained by isomerization of synthetic wax and slack wax, as well as hydrocrackate basestocks produced by hydrocracking (rather than solvent extracting) the aromatic and polar components of the crude.

Natural lubricating oils include animal oils, vegetable oils (for example, rapeseed oils, castor oils, and lard oil), petroleum oils, mineral oils, and oils derived from coal or shale.

Synthetic oils include hydrocarbon oils and halo-substituted hydrocarbon oils such as polymerized and inter-polymerized olefins, alkylbenzenes, polyphenols, alkylated diphenyl ethers, alkylated diphenyl sulfides, as well as their derivatives, analogs and homologs thereof, and the like. Synthetic lubricating oils also include alkylene oxide polymers, interpolymers, copolymers and derivatives thereof wherein the terminal hydroxyl groups have been modified by esterification, etherification, etc. Another suitable class of synthetic lubricating oils comprises the esters of dicarboxylic acids with a variety of alcohols. Esters useful as synthetic oils also include those made from C5 to C12 monocarboxylic acids and polyols and polyol ethers.

Silicon-based oils (such as the polyalkyl-, polyaryl-, polyalkoxy, or polyaryloxy-siloxane oils and silicate oils) comprise another useful class of synthetic lubricating oils. Other synthetic lubricating oils include liquid esters of phosphorus-containing acids, polymeric tetrahydrofurans, polyalphaolefins, and the like.

The lubricating oil may be derived from unrefined, refined, rerefined oils, or mixtures thereof. Unrefined oils are obtained directly from a natural source or synthetic source (for example, coal, shale, or tar and bitumen) without further purification or treatment. Examples of unrefined oils include a shale oil obtained directly from a retorting operation, a petroleum oil obtained directly from distillation, or an ester oil obtained directly from an esterification process, each of which is then used without further treatment. Refined oils are similar to unrefined oils except that refined oils have been treated in one or more purification steps to improve one or more properties. Suitable purification techniques include distillation, hydrotreating, dewaxing, solvent extraction, acid or base extraction, filtration, and percolation, all of which are known to those skilled in the art. Rerefined oils are obtained by treating refined oils in processes similar to those used to obtain refined oils. These rerefined oils are also known as reclaimed or reprocessed oils and often are additionally processed by techniques for removal of spent additives and oil breakdown products.

Lubricating oil base stocks derived from the hydroisomerization of wax may also be used, either alone or in combination with the aforesaid natural and/or synthetic base stocks. Such wax isomerate oil is produced by the hydroisomerization of natural or synthetic waxes or mixtures thereof over hydroisomerization catalyst.

Natural waxes are typically the slack waxes recovered by the sovent dewaxing of mineral oils; synthetic waxes are typically the wax produced by the Fischer-Tropsch process.

The resulting isomerate product is typically subjected to solvent dewaxing and fractionation to recover various fractions of specific viscosity indices, generally having a VI of at least 130, preferably at least 135 and higher and following dewaxing, a pour point of about −20 C and lower.

The production of wax isomerate oil meeting the requirements of the present invention is disclosed and claimed in U.S. Pat. Nos. 4,049,299 and 4,158,671.

Greases or other solid lubricants are also lubricating oils according to this invention.

The synthetic hydrocarbon oils include long chain alkanes such as cetanes and olefin polymers such as trimer and tetramers of octane and decene. These synthetic oils can be mixed with 1) ester oils such as pentaerythritol esters of monocarboxylic acids having about 2 to 20 carbon atoms, 2) polyglycol ethers, 3) polyacetals and 4) siloxane fluids. Useful among the synthetic esters are those made from polycarboxylic acids and monohydric alcohols. For example, ester fluids made from pentaerythritol or mixtures thereof with di- and tripentaerythritol, and an aliphatic monocarboxylic acid containing from 1 to 20 carbon atoms, or mixtures of such acids. Other examples are ester fluids made from trimethylolpropane and an aliphatic monocarboxylic acid containing from 1 to 20 carbon atoms, or mixtures of such acids.

The present lubricating oils are also for example crude oil, industrial lubrication oils, cutting oil, metal working fluids and greases.

Fuels are also a base fluid according to the instant invention, for example certain aviation fuels and the like, wherein lubrication properties are desired. The fuels are for example a hydrocarbonaceous petroleum distillate such as motor gasoline, diesel fuel or fuel oil. Liquid fuel compositions comprising non-hydrocarbonaceous materials such as alcohols, ethers, organo-nitro compounds and the like (e.g. methanol, ethanol, diethyl ether, methyl ethyl ether, nitromethane) are also within the scope of this invention as are liquid fuels derived from vegetable or mineral sources such as corn, alfalfa, shale and coal. Fuels that are mixtures of one or more hydrocarbonaceous fuels and one or more non-hydrocarbonaceous materials are also contemplated. Examples of such mixtures are combinations of gasoline and ethanol and of diesel fuel and ether.

The present additives provide extreme pressure, antiwear and friction reducing properties to the oil, and upon combustion, are innocuous to conventional catalytic converters in automobiles.

The percent by weight of component a) to the total weight of component a) plus component b) is for example from about 0.001 percent to about 99.999 percent. For instance the percent by weight of component a) to the total weight of a) plus b) is from about 0.05 percent to about 90 percent, from about 0.1 percent to about 50 percent, or from about 1 percent to about 10 percent.

The additives of this invention, the combination of component a) and component b), are advantageously present in the oil composition in a total amount of for example about 0.01% to about 20% by weight of the total composition. For instance, the antioxidant compositions are present from about 0.05% to about 15%, from about 0.1% to about 10%, from about 0.2% to about 5% by weight, based on the weight of the entire composition. For example, the antioxidant compositions are present from about 0.1% to about 20%, from about 0.1% to about 15% or from about 0.1% to about 5% by weight, based on the weight of the entire composition.

It is contemplated that in lubricating compositions operated under extremely adverse conditions, such as lubricating compositions for marine diesel engines, that the additives of this invention may be present in amounts of up to about 30% by weight, or more, of the total weight of the lubricating composition.

The additives of this invention are advantageously present in the fuel compositions at a level of from about 1 ppm to about 50,000 ppm based on the fuel. For example the additives are present from about 4 ppm to about 5000 ppm based on the fuel by weight.

Another object of the instant invention is the antioxidant combination of component a) and component b).

Thus, also disclosed are antioxidant compositions comprising a) one or more hindered phenol antioxidant compounds of formula (I), and

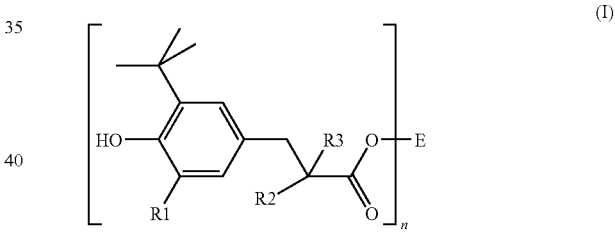

b) one or more further antioxidant compounds, wherein the percent by weight of component a) to the total weight of component a) plus component b) is about 0.001 percent to about 99.999 percent, where R1 is alkyl of 1 to 4 carbon atoms, n is 1 to 4, R2 is H or R3, R3 is —(CH2)$_x$—COOR4 where x is 1 to 10, R4 is straight or branched chain alkyl of 1 to 24 carbon atoms or E, when n is 1, E is straight or branched chain alkyl of 1 to 24 carbon atoms;

when n is 2, E is straight or branched chain alkylene of 2 to 12 carbon atoms or said alkylene interrupted by one to five O or S atoms;

when n is 3, E is a straight or branched chain alkanetriyl of 3 to 6 carbon atoms; and when n is 4, E is pentaerthrityl.

The present invention also relates to a composition comprising a) one or more hindered phenol antioxidant compounds of formula (I),

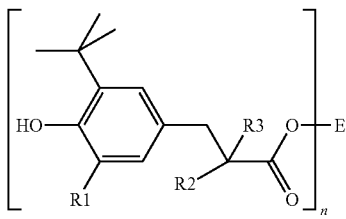

b) one or more further antioxidant compounds, and e) one or more organic materials subject to the deleterious effects of oxidative, thermal, or light-induced degradation, wherein the percent by weight of component a) to the total weight of component a) plus component b) is about 0.001 percent to about 99.999 percent, where R1 is alkyl of 1 to 4 carbon atoms, n is 1 to 4, R2 is H or R3, R3 is —(CH2)$_x$—COOR4 where x is 1 to 10, R4 is straight or branched chain alkyl of 1 to 24 carbon atoms or E, when n is 1, E is straight or branched chain alkyl of 1 to 24 carbon atoms;

when n is 2, E is straight or branched chain alkylene of 2 to 12 carbon atoms or said alkylene interrupted by one to five O or S atoms;

when n is 3, E is a straight or branched chain alkanetriyl of 3 to 6 carbon atoms; and when n is 4, E is pentaerthyrityl.

The invention therefore furthermore relates to compositions comprising an organic material in component e) which is sensitive to oxidative, thermal, or light-induced degradation and one or more compounds listed in component a) formula (I) and one or more antioxidant compounds listed in component b).

The invention therefore also relates to a process for stabilizing an organic material in component e) which is sensitive to oxidative, thermal, or light-induced degradation, which comprises adding, to this material, one or more compounds listed in component a) formula (I) and one or more antioxidant compounds listed in component b).

Organic materials in component e) which would benefit from the incorporation of the instant antioxidants are polymers, for example synthetic polymers, in particular thermoplastic polymers. Particularly preferred organic materials in component e) are polyolefins and styrene copolymers, for example those mentioned in U.S. Pat. No. 5,478,875 under items 1 to 3 and items 6 and 7, incorporated herein by reference. Especially preferred organic materials in component e) are for example polyethylene, polypropylene, ABS, and styrene/butadiene copolymers. The instant invention therefore preferably relates to compositions in which the organic material in component e) is a synthetic organic polymer or a mixture of such polymers, in particular a polyolefin or a styrene copolymer.

The instant invention also relates to a method of improving oxidative performance in a lubricating oil composition comprising b) one or more antioxidant compounds selected from the group consisting of
n-octadecyl 3,5-di-tert-butyl-4-hydroxyhydrocinnamate,
isooctyl 3,5-di-tert-butyl-4-hydroxyhydrocinnamate,
neopentanetetrayl tetrakis(3,5-di-tert-butyl-4-hydroxyhydrocinammate),
1,3,5-tris(3,5-di-tert-butyl-4-hydroxybenzyl)isocyanurate,
thiodiethylene bis(3,5-di-tert-butyl-4-hydroxyhydrocinnamate),
1,3,5-trimethyl-2,4,6-tris(3,5-di-tert-butyl-4-hydroxybenzyl)benzene,
3,6-dioxaoctamethylene bis(3-methyl-5-tert-butyl-4-hydroxyhydrocinnamate),
2,6-di-tert-butyl-p-cresol,
2,2'-ethylidene-bis(4,6-di-tert-butylphenol),
1,3,5-tris(2,6-dimethyl-4-tert-butyl-3-hydroxybenzyl) isocyanurate,
1,1,3,-tris(2-methyl-4-hydroxy-5-tert-butylphenyl)butane,
1,3,5-tris[2-(3,5-di-tert-butyl-4-hydroxyhydrocinnamoyloxy)ethyl] isocyanurate,
3,5-di-(3,5-di-tert-butyl-4-hydroxybenzyl)mesitol,
hexamethylene bis(3,5-di-tert-butyl-4-hydroxyhydrocinnamate),
1-(3,5-di-tert-butyl-4-hydroxyanilino)-3,5-di(octylthio)-s-triazine,
N,N'-hexamethylene-bis(3,5-di-tert-butyl-4-hydroxyhydrocinnamamide),
calcium bis(ethyl 3,5-di-tert-butyl-4-hydroxybenzylphosphonate),
ethylene bis[3,3-di(3-tert-butyl-4-hydroxyphenyl)butyrate],
octyl 3,5-di-tert-butyl-4-hydroxybenzylmercaptoacetate,
bis(3,5-di-tert-butyl-4-hydroxyhydrocinnamoyl)hydrazide,
N,N'-bis[2-(3,5-di-tert-butyl-4-hydroxyhydrocinnamoyloxy)-ethyl]oxamide,
2,6-di-tert-butylphenol,
2,4-di-tert-butylphenol,
methyl 3,5-di-tert-butyl-4-hydroxyhydrocinnamate,
pentaerythritol tris(3,5-di-tert-butyl-4-hydroxyhydrocinnimate),
pentaerythritol di(3,5-di-tert-butyl-4-hydroxyhydrocinnimate),
tris(2,4-di-tert-butylphenyl) phosphite,
di-n-octadecyl 3,5-di-tert-butyl-4-hydroxybenzylphosphonate,
N,N-di-($C_{14}$-$C_{24}$alkyl)-N-methylamine oxide, and
N,N-di(hydrogenated tallow)hydroxylamine, and c) a base fluid, which method comprises incorporating into said lubricating oil composition one or more compounds of component a) formula (I).

The lubricating oils stabilized in accordance with the invention may additionally or optionally include other additives, component d), which are added in order to improve still further the basic properties of these formulations; such additives include other antioxidants, metal passivators, rust inhibitors, corrosion inhibitors, viscosity index improvers, extreme pressure agents, pour point depressants, solid lubricants, dispersants, detergents, antifoams, color stabilizers, further extreme pressure additives, demulsifiers, friction modifiers, and, antiwear additives. Such additives are added in the customary amounts in each case in the range from in each case about 0.01% to 10.0% by weight, based on the lubricating oil.

The text below gives examples of such additional additives:

Examples of antioxidants are:

1) alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-iso-butylphenol, 2,6-di-cyclopentyl-4-methylphenol, 2-(a-methyl-cyclohexyl)-4,6-dimethylphenol, 2,6-di-octadecyl-4-methylphenol, 2,4,6-tri-cyclohexylphenol, 2,6-di-tert-butyl-4-methoxymethylphenol, linear or sidechain-branched nonylphenols, for example 2,6-di-nonyl-4-methylphenol, 2,4-dimethyl-6-(1'-methyl-undec-1'-yl)phenol, 2,4-dimethyl-6-(1'-methylheptadec-1'-yl)phenol, 2,4-dimethyl-6-(1'-methyltridec-1'-yl)phenol or mixtures thereof;

2) alkylthiomethylphenols, for example 2,4-di-octylthiomethyl-6-tert-butylphenol, 2,4-di-octylthiomethyl-6-methylphenol, 2,4-di-octylthiomethyl-6-ethylphenol or 2,6-di-dodecylthiomethyl-4-nonylphenol;

3) hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butyl-hydroquinone, 2,5-di-tert-butyl-4-hydroxyanisole, 3,5-di-tert-butyl-4-hydroxyanisole, 3,5-di-tert-butyl-4-hydroxyphenyl stearate or bis(3,5-di-tert-butyl-4-hydroxyphenyl) adipate;

4) tocopherols, for example α-, β-, γ- or ε-tocopherol or mixtures thereof (vitamin E);

5) hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis-(6-tert-butyl-2-methylphenol), 4,4'-thiobis(3,6-di-sec-amylphenol) or 4,4'-bis(2,6-dimethyl-4-hydroxyphenyl) disulfide;

6) alkylidenebisphenols, for example 2,2'-methylenebis(6-tert-butyl-4-methylphenol), 2,2'-methylenebis(6-tert-butyl-4-ethylphenol), 2,2'-methylenebis(4-methyl-6-(alpha-methylcyclohexyl)-phenol), 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis(6-(alpha-methylbenzyl)-4-nonylphenol), 2,2'-methylenebis(6-(alpha,alpha-dimethylbenzyl)-4-nonylphenol), 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis(3,3-bis(3'-tert-butyl-4'-hydroxyphenyl)butyrate), bis(3-tert-butyl-4-hydroxy-5-methylphenyl)dicyclo-pentadiene, bis(2-(3'-tert-butyl-2'-hydroxy-5'-methylbenzyl)-6-tert-butyl-4-methylphenyl)terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane or 1,1,5,5-tetra(5-tert-butyl-4-hydroxy-2-methylphenyl)-pentane;

7) O- N- and S-benzyl compounds, for example 3,5,3',5'-tetra-tert-butyl-4,4'-dihydroxydibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl)amine, bis(4-tert-butyl-3-hydroxy-2,6-dimethylbenzyl)dithioterephthalate, bis(3,5-di-tert-butyl-4-hydroxybenzyl) sulfide or isooctyl 3,5-di-tert-butyl-4-hydroxybenzylmercaptoacetate;

8) hydroxybenzylated malonates, for example-dioctadecyl 2,2-bis(3,5-di-tert-butyl-2-hydroxybenzyl)malonate, dioctadecyl 2-(3-tert-butyl-4-hydroxy-5-methylbenzyl)-malonate, di-dodecyl mercaptoethyl-2,2-bis(3,5-di-tert-butyl-4-hydroxybenzyl)-malonate or di(4-(1,1,3,3-tetramethylbutyl)phenyl)2,2-bis(3,5-di-tert-butyl-4-hydroxybenzyl)malonate;

9) aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene or 2,4,6-tris(3,5-di-tert-butyl-4-hydroxybenzyl)phenol;

10) triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)-isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine or 1,3,5-tris(3,5-dicyclohexyl-4-hydroxybenzyl)-isocyanurate;

11) benzylphosphonates, for example dimethyl 2,5-di-tert-butyl-4-hydroxybenzyl-phosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate or the calcium salt of the monoethyl ester of 3,5-di-tert-butyl-4-hydroxybenzylphosphonic acid;

12) acylaminophenols, for example 4-hydroxylauranilide, 4-hydroxystearanilide or octyl N-(3,5-di-tert-butyl-4-hydroxyphenyl)carbamate;

13) esters of β-(3,5-di-tert-butyl-4-hydroxyphenyl)propionic acid, β-(5-tert-butyl-4-hydroxy-3-methylphenyl)propionic acid, β-(3,5-dicyclohexyl-4-hydroxyphenyl)-propionic acid, 3,5-di-tert-butyl-4-hydroxyphenylacetic acid or β-(5-tert-butyl-4-hydroxyphenyl)-3-thiabutyric acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethyl-hexanediol, trimethylolpropane, 4-hydroxymethyl-1-phospha-2,6,7-trioxabicyclo(2.2.2)octane, glycerol or transesterification products based on natural triglycerides of, for example, coconut oil, rape seed oil, sunflower oil or colza oil;

14) amides of β-(3,5-di-tert-butyl-4-hydroxyphenyl)propionic acid, e.g. N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine or N,N'-bis(3,5-di-tert-butyl-4-hydroxyphenylpropionyl)hydrazine;

The previous list of items 1) through 14) are examples of phenolic antioxidants which are well known in the prior art.

15) ascorbic acid (vitamin C);

16) amine-type antioxidants, for example N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methyl-pentyl)-p-phenylenediamine, N,N'-bis(1-methyl-heptyl)-p-phenylendiamine, N,N'-dicyclohexyl-p-phenylenediamine, N,N'-diphenyl-p-phenylenediamine, N,N'-di-(naphth-2-yl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfonamido)diphenylamine, N,N'-dimethyl-N,N'-di-sec-butyl-p-phenylenediamine, diphenylamine, N-allyldiphenylamine, 4-isopropoxy-diphenylamine, N-phenyl-1-naphthylamine, N-(4-tert-octylphenyl)-1-naphthylamine, N-phenyl-2-naphthylamine, octylated diphenylamine, e.g. p,p'-di-tert-octyidiphenyl-amine, 4-n-butylaminophenol, 4-butyrylamino-phenol, 4-nonanoylamino-phenol, 4-dodecanoylaminophenol, 4-octadecanoylamino-phenol, di-(4-methoxyphenyl)-amine, 2,6-di-tert-butyl-4-dimethylamino-methyl-phenol, 2,4'-diamino-diphenylmethane, 4,4'-diamino-diphenylmethane, N,N,N',N'-tetramethyl-4,4'-diamino-diphenylmethane, 1,2-di-((2-methyl-phenyl)-amino)-ethane, 1,2-di-(phenylamino)propane, (o-tolyl) biguanide, di(4-(1',3'-dimethyl-butyl)-phenyl)amine, tert-octylated N-phenyl-1-naphthylamine, a mixture of mono- and dialkylated tert-butyl/tert-octyidiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, mixtures of mono- and dialkylated tert-butyidiphenylamines, 2,3-dihydro-3,3-dimethyl-4H-1,4-benzothiazine, phenothiazine, a mixture of mono- and dialkylated tert-butyl/tert-octyl-phenothiazines, a mixture of mono- and dialkylated tert-octyl-phenothiazines, N-allylphenothiazine, N,N,N',N'-tetraphenyl-1,4-diaminobut-2-ene, N,N-bis-(2,2,6,6-tetramethylpiperidin-4-yl)hexamethylenediamine, bis-(2,2,6,6-tetramethylpiperidin-4-yl) sebacate, 2,2,6,6-tetramethylpiperidin-4-one or 2,2,6,6-tetramethylpiperidin-4-ol; and 17) aliphatic or aromatic phosphites, esters of thiodipropionic acid or of thiodiacetic acid, or salts of dithiocarbamic or dithiophosphoric acid, 2,2,12,12-tetramethyl-5,9-dihydroxy-3,7,1-trithiatridecane or 2,2,15,15-tetramethyl-5,12-dihydroxy-3,7,10,14-tetrathiahexadecane.

Examples of metal passivators, for example for copper, are:
1) benzotriazoles and their derivatives, for example 4- or 5-alkylbenzotriazoles (e.g. tolutriazole) and derivatives thereof, 4,5,6,7-tetrahydrobenzotriazole, 5,5'-methylenebisbenzotriazole; Mannich bases of benzotriazole or tolutriazole, such as 1-(di(2-ethylhexyl)aminomethyl)tolutriazole and 1-(di(2-ethylhexyl)aminomethyl)-benzotriazole; alkoxyalkylbenzotriazoles, such as 1-(nonyloxymethyl)-benzotriazole, 1-(1-butoxyethyl)-benzotriazole and 1-(1-cyclohexyloxybutyl)-tolutriazole;
2) 1,2,4-triazoles and derivatives thereof, for example 3-alkyl(or aryl)-1,2,4-triazoles, Mannich bases of 1,2,4-triazoles such as 1-(di(2-ethylhexyl)aminomethyl)-1,2,4-triazole; alkoxyalkyl-1,2,4-triazoles such as 1-(1-butoxyethyl)-1,2,4-triazole; acylated 3-amino-1,2,4-triazoles;
3) imidazole derivatives, for example 4,4'-methylenebis(2-undecyl-5-methyl-imidazole), bis((N-methyl)imidazol-2-yl) carbinol octyl ether;
4) sulfur-containing heterocyclic compounds, for example 2-mercaptobenzothiazole, 2,5-dimercapto-1,3,4-thiadiazole, 2,5-dimercaptobenzothiadiazole and derivatives thereof; 3,5-bis(di(2-ethylhexyl)aminomethyl)-1,3,4-thiadiazolin-2-one; and
5) amino compounds, for example salicylidenepropylenediamine, salicylaminoguanidine and salts thereof.

Examples of rust inhibitors are:
1) organic acids, their esters, metal salts, amine salts and anhydrides, for example alkyl- and alkenylsuccinic acids and the partial esters thereof with alcohols, diols or hydroxycarboxylic acids, partial amides of alkyl- and alkenylsuccinic acids, 4-nonylphenoxyacetic acid, alkoxy- and alkoxyethoxycarboxylic acids, such as dodecyloxyacetic acid, dodecyloxy(ethoxy)acetic acid and the amine salts thereof, and also N-oleoylsarcosine, sorbitan monooleate, lead naphthenate, alkenylsuccinic anhydrides, for example dodecenylsuccinic anhydride, 2-(2-carboxyethyl)-1-dodecyl-3-methylglycerine and its salts, especially sodium and triethanolamine salts;
2) nitrogen-containing compounds, for example:
 i) primary, secondary or tertiary aliphatic or cycloaliphatic amines and amine salts of organic and inorganic acids, for example oil-soluble alkylammonium carboxylates, and also 1-(N,N-bis(2-hydroxyethyl)amino)-3-(4-nonylphenoxy)propan-2-ol;
 ii) heterocyclic compounds, for example: substituted imidazolines and oxazolines, 2-heptadecenyl-1-(2-hydroxyethyl)-imidazoline;
3) phosphorus-containing compounds, for example Amine salts of phosphoric acid partial esters or phosphonic acid partial esters, zinc dialkyldithiophosphates;
4) sulfur-containing compounds, for example: barium dinonylnaphthalene-sulfonates, calcium petroleumsulfonates, alkylthio-substituted aliphatic carboxylic acids, esters of aliphatic 2-sulfocarboxylic acids and salts thereof; and
5) glycerine derivatives, for example: glycerine monooleate, 1-(alkylphenoxy)-3-(2-hydroxyethyl)glycerines, 1-(alkylphenoxy)-3-(2,3-dihydroxypropyl)glycerines, 2-carboxyalkyl-1,3-dialkylglycerines.

Viscosity index improvers useful in the present invention include any of the polymers which impact enhanced viscosity properties to the finished oil and are generally hydrocarbon-based polymers having a molecular weight, Mw, in the range of between about 2,000 to 1,000,000, preferably about 50,000 to 200,000. Viscosity index improver polymers typically include olefin copolymers, for example, ethylene-propylene copolymers, ethylene-(iso)-butylene copolymers, propylene-(iso)-butylene copolymers, ethylene-polyalphaolefin copolymers, polymethacrylates; styrene-diene block copolymers, for example, styrene-isoprene copolymers, and star copolymers; polyacrylates, vinylpyrrolidone/methacrylate copolymers, polyvinylpyrrolidones, polybutenes, styrene/acrylate copolymers, and polyethers. Viscosity index improvers may be monofunctional or multifunctional, such as those bearing substituents that provide a secondary lubricant performance feature such as dispersancy, pour point depression, etc.

Examples of pour point depressants are:
polymethacrylate, alkylated naphthalene derivatives.

Examples of dispersants/surfactants are:
polybutenylsuccinamides or -imides, polybutenylphosphonic acid derivatives, and basic magnesium, calcium and barium sulfonates, phenolates and salicylates.

Examples of antifoams are: silicone oils and polymethocrylen.

The demulsifiers are for example selected from:
polyetherpolyols and dinonylnaphthalenesulfonates.

The friction modifiers are for example selected from:
fatty acids and their derivatives (i.e. natural esters of fatty acids such as glycerol monooleate), amides, imides and amines (i.e. oleylamine), sulfur containing organomolybdenum dithiocarbamates, sulfur-phosphorus containing organomolybdenum dithiophosphates, sulfur-nitrogen containing organomolybdenum compounds based on dispersants, molybdenum carboxylate salts, molybdenum-amine complexes, molybdenum amine/alcohol/amid complexes and molybdenum cluster compounds, Teflon™ and molybdenum disulfide.

Examples of antiwear additives are:

sulfur- and/or phosphorus- and/or halogen-containing compounds, such as sulfurized olefins and vegetable oils, zinc dialkyldithiophosphates, tritolyl phosphate, tricresyl phosphate, chlorinated paraffins, alkyl and aryl di- and trisulfides, amine salts of mono- and dialkyl phosphates, amine salts of methylphosphonic acid, diethanolaminomethyltolyltriazole, di-(2-ethylhexyl)-aminomethyltolyltriazole, derivatives of 2,5-dimercapto-1,3,4-thiadiazole, ethyl(bisisopropyloxyphosphinothioyl)thiopropionate, triphenyl thiophosphate (triphenyl phosphorothioate), tris(alkylphenyl) phosphorothioates and mixtures thereof (for example tris (isononylphenyl) phosphorothioate), diphenylmononylphenyl phosphorothioate, isobutylphenyl diphenyl phosphorothioate, the dodecylamine salt of 3-hydroxy-1,3-thiaphosphetan 3-oxide, trithiophosphoric acid 5,5,5-tris-isooctyl 2-acetate, derivatives of 2-mercaptobenzothiazole, such as 1-N,N-bis(2-ethylhexyl)aminomethyl-2-mercapto-1H-1,3-benzothiazole, and ethoxycarbonyl 5-octyldithiocarbamate;

dihydrocarbyl dithiophosphate metal salts where the metal is aluminum, lead, tin manganese, cobalt, nickel, zinc or copper, but most often zinc. The zinc salt (zinc dialkyl dithiophosphate) is represented as

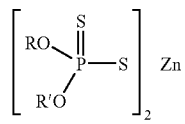

where R and R' are independently $C_1$-$C_{20}$ alkyl, $C_3$-$C_{20}$ alkenyl, $C_5$-$C_{12}$ cycloalkyl, $C_7$-$C_{13}$ aralkyl or $C_6$-$C_{10}$ aryl, for example R and R' are independently $C_1$-$C_{12}$ alkyl;

Antiwear additives as described in U.S. Pat. Nos. 4,584, 021; 5,798,321; 5,750,478; 5,801,130; 4,191,666; 4,720,288; 4,025,288; 4,025,583 and WO 095/20592, which U.S. patents are incorporated herein by reference; amines for example polyalkylene amines such as ethylene diamine, diethylene triamine, triethylene tetraamine, tetraethylene pentamine, pentaethylene hexamine, nonaethylene decamine and aryl amines as described in U.S. Pat. No. 4,267,063, herein incorporated by reference; salts of amine phosphates comprising specialty amines and mixed mono- and di-acid phosphates; the mono- and di-acid phosphate amines have the structural formulae:

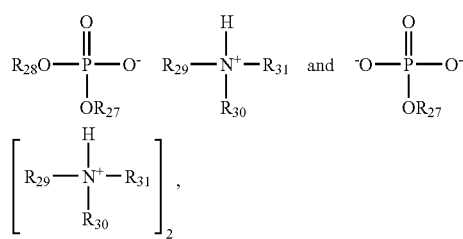

wherein $R_{27}$ is hydrogen, $C_1$-$C_{25}$ linear or branched chain alkyl which is unsubstituted or substituted by one or more $C_1$-$C_6$alkoxy groups, a saturated acyclic or alicyclic group, or aryl;

$R_{28}$ is $C_1$-$C_{25}$ linear or branched chain alkyl which is unsubstituted or substituted by oneor more $C_1$-$C_6$alkoxy groups, a saturated acyclic or alicyclic group, or aryl;

$R_{29}$ is hydrogen, $C_1$-$C_{25}$ linear or branched chain alkyl, a saturated or unsaturated acyclic or alicyclic group, or aryl; and are hydrogen or $C_1$-$C_{12}$ linear or branched chain alkyl; and $R_{30}$ and $R_3$, are, each independently of the other, $C_1$-$C_{25}$ linear or branched chain alkyl, a saturated or unsaturated acyclic or alicyclic group, or aryl. Preferably, $R_{27}$ and $R_{28}$ are linear or branched $C_1$-$C_{12}$ alkyl; and $R_{29}$, $R_{30}$ and $R_3$, are linear or branched $C_1$-$C_{18}$ alkyl;

IRGALUBE 349 (Ciba Specialty Chemicals) has been found to be very useful, particularly by enhancing the wear performance of the base oil such that it meets stringent military performance specifications; IRGALUBE 349 has the formula

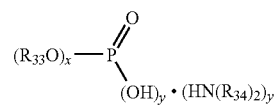

wherein $R_{33}$ is n-hexyl, $R_{34}$ is $C_{11}$-$C_{14}$ branched alkyl, and when x=1 then y=2; when x=2 then y=1; Irgalube® 349 is a mixture of amine phosphates, CAS # 80939-62-4;

other conventional antiwear additives are compounds of the formula

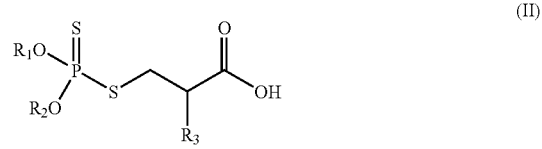

(II)

in which $R_1$ and $R_2$ independently of one another are $C_3$-$C_{18}$ alkyl, $C_5$-$C_{12}$ cycloalkyl, $C_5$-$C_6$ cycloalkylmethyl, $C_9$-$C_{10}$ bicycloalkylmethyl, $C_9$-$C_{10}$ tricycloalkylmethyl, phenyl or $C_7$-$C_{24}$ alkylphenyl or together are $(CH_3)_2C(CH_2)_2$, $R_3$ is hydrogen or methyl. For example, lrgalube® 353, a dialkyl dithiophosphate ester, CAS # 268567-32-4, Ciba Specialty Chemicals.

The present lubricating oil compositions can contain, in addition to the antioxidant additives, other additives which are well known to those of skill in the art. These include antiknock agents such as tetralkyl lead compounds, lead scavengers such as haloalkanes (e.g., ethylene dichloride and ethylene dibromide), deposit preventers or modifiers such as triaryl phosphates, dyes, cetane improvers, antioxidants such as 2,6-di-tert-butyl-4-methylphenol, rust inhibitors such as alkylated succinic acids and anhydrides, bacteriostatic agents, gum inhibitors, metal deactivators, demulsifiers, upper cylinder lubricants and anti-icing agents.

The present antioxidant compositions can be introduced into the lubricating oil in manners known per se. The compounds are readily soluble in oils. They may be added directly to the lubricating oil or they can be diluted with a substantially inert, normally liquid organic diluent such as naphtha, benzene, toluene, xylene or a normally liquid oil or fuel to form an additive concentrate or masterbatch. These concentrates generally contain from about 10% to about 90% by weight additive and may contain one or more other additional additives. The present antioxidant compositions may be introduced as part of an additive package.

The present invention is further illustrated by the following Examples:

EXAMPLE 1

Octyl 3,5-di-tert-butyl-4-hydroxyhydrocinnamate

Methyl 3,5-di-tert-butyl-4-hydroxyhydrocinnamate (256 g, 0.88 mole) and isooctanol (133 g, 0.91 mole) are added to a laboratory reactor equipped with the necessary auxiliary equipment. The mixture is heated to 85 C under a vacuum of 30 mmHg. After fifteen minutes, the vacuum is released and aluminum isopropoxide (1.77 g, 0.0087 mole, Rhone-Poulenc, Manalox 130) is added. The reaction mass is heated to 130 C while under a vacuum of 75 mmHg. After two hours, the reaction mass is heated to 165 C while under a vacuum of 30 mmHg for one hour. The excess isooctanol is removed by vacuum distillation at 165 C. The title compound (331 g, 97% yield) is obtained as a light yellow oil whose assay is 97% as judged by calibrated gas chromatography.

EXAMPLE 2

Antioxidant Composition

During the manufacture of phenolic antioxidants and phosphites, many of these products are crystallized from organic solvents; for example, methanol and isopropanol. In order to be economically feasible, these solvent streams are blended together and the solvents are recovered by distillation. The residue that remains after solvent distillation contains (as analyzed by calibrated gas chromatography): 2,6-di-tert-butylphenol=5.4 wt %; 2,4-di-tert-butylphenol=0.35 wt %; methyl 3,5-di-tert-butyl-4-hydroxyhydrocinnamate=21.2 wt %; Compound A=29 wt %; thiodiethylene bis(3,5-di-tert-butyl-4-hydroxyhydrocinnamate)=3.7 wt %; neopentanetetrayl tetrakis(3,5-di-tert-butyl-4-hydroxyhydrocinammate) =2.2 wt %; pentaerythritol tris(3,5-di-tert-butyl-4-hydroxyhydrocinnimate)=5.9%; pentaerythritol di(3,5-di-tert-butyl-4-hydroxyhydrocinnimate)=4.3 wt %; n-octadecyl 3,5-di-tert-butyl-4-hydroxyhydrocinnamate=4.2 wt %; and, tris(2,4-di-tert-butylphenyl) phosphite=0.3 wt %.

Compound A is

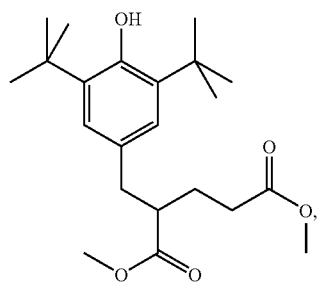

dimethyl alpha-(3,5-di-tert-butyl-4-hydroxylbenzyl)glutarate.

It is now found that this composition is quite an effective antioxidant.

EXAMPLE 3

Antioxidant Composition

During the manufacture of phenolic antioxidants, many of these products are purified by distillation. The distillation residue that remains contains (as analyzed by calibrated gas chromatography): 2,6-di-tert-butylphenol=42.3 wt %; 2,4-di-tert-butylphenol=0.85 wt %; methyl 3,5-di-tert-butyl-4-hydroxyhydrocinnamate=29.0 wt %; and, Compound A=27.9 wt %.

Compound A is

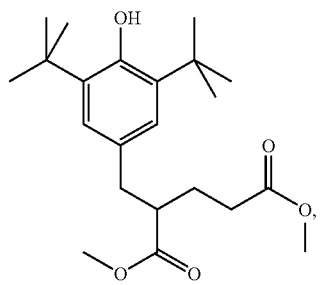

dimethyl alpha-(3,5-di-tert-butyl-4-hydroxylbenzyl)glutarate.

It is now found that this composition is quite an effective antioxidant.

EXAMPLE 4

Antioxidant Composition

Instant Example 1 (80 g, 0.21 mole), Instant Example 2 (20 g), and methanol (2.8 g, 0.088 mole) are added to a flask and stirred until homogeneous. The solution is then heated under reduced pressure to remove any moisture and methanol. Distillation is continued until a constant weight is received. The title antioxidant composition is received (99 g) as light amber oil.

EXAMPLE 5

Antioxidant Composition

Instant Example 1 (90 g, 0.23 mole), Instant Example 2 (10 g), and methanol (1.4 g, 0.044 mole) are added to a flask and stirred until homogeneous. The solution is then heated under reduced pressure to remove any moisture and methanol. Distillation is continued until a constant weight is received. The title antioxidant composition is received (98 g) as light amber oil.

EXAMPLE 6

Antioxidant Composition

Instant Example 1 (95 g, 0.24 mole), Instant Example 2 (5 g), and methanol (0.7 g, 0.022 mole) are added to a flask and stirred until homogeneous. The solution is then heated under reduced pressure to remove any moisture and methanol. Distillation is continued until a constant weight is received. The title antioxidant composition is received (99 g) as light amber oil.

EXAMPLE 7

Antioxidant Composition

Methyl 3,5-di-tert-butyl-4-hydroxyhydrocinnamate (254 g, 0.87 mole), isooctanol (142.5 g, 1.09 mole, Exxal 8 from Exxon), and Instant Example 2 (51 g) are added to a reaction flask and heated to 85 C under vacuum. The vacuum is released and aluminum isopropoxide (5 g, 0.025 mole, Rhone Poulenc, Manalox 130) is added portion wise. A vacuum of 28 inches of Hg is applied while heating to 130 C. After seven hours, the temperature is increased to 165 C for three hours. The excess isooctanol is removed by distillation under reduced pressure. The title antioxidant composition is received (380.2 g) as a light amber oil and is shown to contain 87.6 wt % of isooctylesters (as a mixture) by calibrated gas chromatography.

EXAMPLE 8

Antioxidant Composition

Methyl 3,5-di-tert-butyl-4-hydroxyhydrocinnamate (125 g, 0.43 mole), isooctanol (75 g, 0.58 mole, Exxal 8 from Exxon), and Instant Example 3 (30.3 g) are added to a reaction flask and heated to 87 C under vacuum. The vacuum is released and aluminum isopropoxide (0.78 g, 0.004 mole, Rhone Poulenc, Manalox 130) is added. A vacuum of 100 mm of Hg is applied while heating to 150 C. After two and one-half hours, the excess isooctanol is removed by distillation under reduced pressure. The title antioxidant composition is received (187.3 g) as a light amber oil and is shown to contain 88.2 wt % of isooctylesters (as a mixture) by calibrated gas chromatography.

EXAMPLE 9

Antioxidant Composition

Methyl 3,5-di-tert-butyl-4-hydroxyhydrocinnamate (10,224 g, 34.97 moles), isooctanol (6002 g, 46.1 moles, Exxal 8 from Exxon), and Instant Example 3 (1139 g) are added to a reaction flask and heated to 100 C under vacuum. The vacuum is released and aluminum isopropoxide (244.2 g, 1.25 mole, Rhone Poulenc, Manalox 130) is added. A vacuum of 28 inches of Hg is applied while heating to 150 C. After one hour, the temperature is increased to 165 C for three hours. The excess isooctanol is removed by distillation under reduced pressure. The title antioxidant composition is received (15,164 g) as a light amber oil and is shown to contain 90.8 wt % of isooctylesters (as a mixture) by calibrated gas chromatography.

EXAMPLE 10

Antioxidant Composition

Methyl 3,5-di-tert-butyl-4-hydroxyhydrocinnamate (8640 g, 29.5 moles), isooctanol (5339 g, 41 moles, Exxal 8 from Exxon), and Instant Example 2 (2229 g) are added to a reaction flask and heated to 100 C under vacuum. The vacuum is released and aluminum isopropoxide (120 g, 0.62 mole, Rhone Poulenc, Manalox 130) is added. A vacuum of 100 mm of Hg is applied while heating to 150 C. After two and one-half hours, the excess isooctanol is removed by distillation under reduced pressure. The title antioxidant composition is received (13,497 g) as a light amber oil and is shown to contain 88.1 wt % of isooctylesters (as a mixture) by calibrated gas chromatography.

EXAMPLE 11

Antioxidant Composition

Methyl 3,5-di-tert-butyl-4-hydroxyhydrocinnamate (8909 g, 30.5 moles), isooctanol (4999 g, 38.4 mole, Exxal 8 from Exxon), and Instant Example 2 (1815 g) are added to a reaction flask and heated to 100 C under vacuum. The vacuum is released and aluminum isopropoxide (174 g, 0.89 mole, Rhone Poulenc, Manalox 130) is added portion wise. A vacuum of 28 inches of Hg is applied while heating to 130 C. After seven hours, the temperature is increased to 165 C for three hours. The excess isooctanol is removed by distillation under reduced pressure. The title antioxidant composition is received (13,834 g) as a light amber oil and is shown to contain 89.0 wt % of isooctylester (as a mixture) by calibrated gas chromatography.

EXAMPLE 12

Antioxidant Composition

Methyl 3,5-di-tert-butyl-4-hydroxyhydrocinnamate (220.3 lbs., 0.75 lb.mole), isooctanol (138.5 lbs., 1.06 lb mole, Exxal 8 from Exxon), and Instant Example 3 (67.7 lbs) are added to a reactor and heated to 100 C under vacuum. The vacuum is released and aluminum isopropoxide (650 g, 3.3 mole, Rhone Poulenc, Manalox 130) is added. A vacuum of 150 mm of Hg is applied while heating to 150 C. After two and one-half hours, the excess isooctanol is removed by distillation under reduced pressure. The title antioxidant composition is received (356.9 lbs.) as a light amber oil and is shown to contain 85.9 wt % of isooctylesters (as a mixture) by calibrated gas chromatography.

EXAMPLE 13

Flash Point Test

A flash point test is performed on the instant examples to ensure no volatile, flammable components are present. The samples are tested using an Erdco Rapid Tester Model RT-1 at 72F, 141F, and 199F. The results are summarized below.

| Instant Example | Flash Point (° C.) |
| --- | --- |
| 4 | >199 |
| 5 | >199 |
| 6 | >199 |
| 8 | >199 |

The results indicate that the instant compositions do not contain volatile, flammable components. This is advantageous when the instant examples are used in lubricating or engine oil compositions.

EXAMPLE 14

TGA Analysis

A thermogravimetric analysis (TGA) is performed on the instant examples to evaluate their volatility at elevated temperatures. The weight loss of samples as temperature is increased is monitored and the temperatures at which a ten percent and fifty percent weight loss occur are noted. The results are summarized below.

| Instant Example | Temperature at 10% loss (° C.) | Temperature at 50% loss (° C.) |
|---|---|---|
| 1 | 216 | 260 |
| 9 | 224 | 271 |
| 11 | 228 | 275 |
| 10 | 230 | 276 |

The data show that the instant compounds are less volatile than Instant Example 1, a compound known in the prior art. For lubricating oil compositions, having components that are less volatile is advantageous.

EXAMPLE 15

High Temperature Deposit Test

The instant compounds are evaluated for their ability to reduce deposit formation in lubricants such as passenger car motor oil and diesel engine oil formulations. Thin films of oil on steel cups are heated at 230° C. in the Alcor Micro Carbon Residue Tester for increasing periods of time. After each time interval the cups are washed with hexane and the amount of residue left behind is determined. The difference in percent deposits formed by a base formulation for a set time interval is compared with those formed by the base formulation plus stabilizers. The magnitude of a beneficial decrease in deposit formation is related as a ratio that is designated the performance index (PI). The higher the PI, the better the sample is at controlling deposit formation.

Each formulation contains 1.5% by weight of stabilizer in a fully formulated SAE 5W-30 passenger car motor oil, GF-4 type formulation with 0.05% phosphorus by weight.

| Instant Example | Performance Index (PI) |
|---|---|
| 1 | 6 |
| 11 | 24 |
| 10 | 34 |
| 12 | 45 |
| 9 | 67 |

The instant compounds are shown to be quite efficacious at controlling deposit formation in engine oil compositions at elevated temperatures.

EXAMPLE 16

Hot Tube Test

The instant compounds are evaluated in a test that measures the deposit forming tendencies of an oil. In the test, oil droplets are pushed upward by compressed air inside a glass capillary tube that is heated to 248 C. Test oil percolates upward through the tube for 16 hours forming a lacquer on the inner wall of the tube. At the conclusion of the test, the tube is washed, dried and rated for cleanliness on a 0-10 scale (0=dirty, 10=clean).

Each formulation contains 1.5% by weight of stabilizer in a fully formulated SAE 5W-30 passenger car motor oil, GF-4 type formulation with 0.05% phosphorus by weight. The data are summarized below and represent the average of two tests.

| Instant Example | Cleanliness |
|---|---|
| 1 | 4.5 |
| 10 | 4.7 |
| 11 | 4.8 |
| 12 | 5.0 |

The instant compounds are shown to be quite efficacious in lubricating oil compositions.

EXAMPLE 17

HPDSC Test

High pressure differential scanning calorimetry (HPDSC) is an analytical technique that evaluates oxidative performance of additives in various substrates. A TA Instruments Model 2920 is used for the evaluations. The test is run under pressure to prevent volatilization of the material to be evaluated. In this evaluation, the samples, in aluminum pans, are heated isothermally at 210° C. in a cell pressurized to 100 psig with air. The time until an exothermic reaction occurs (oxidation induction time) is measured. The longer the oxidation induction period, the more stable the sample.

Each formulation contains 1.5% by weight of stabilizer in a fully formulated SAE 5W-30 passenger car motor oil, GF-4 type formulation with 0.05% phosphorus by weight. The data are summarized below and represent the average of two tests.

| Instant Example | Oxidation Induction Time (minutes) |
|---|---|
| 1 | 94 |
| 9 | 95 |
| 11 | 95 |
| 12 | 105 |

The instant compounds are shown to be quite efficacious at extending the oxidative performance of engine oil compositions at elevated temperatures.

EXAMPLE 18

Antioxidant Composition

Methyl 3,5-di-tert-butyl-4-hydroxyhydrocinnamate, isooctanol, and Instant Example 3 are added to a reactor and heated to 100 C under vacuum. The vacuum is released and Manalox 130 is added. A vacuum of 150 mm of Hg is applied while heating to 150 C. After two and one-half hours, the excess isooctanol is removed by distillation under reduced pressure. Under these reaction conditions, dimethyl alpha-(3,5-di-tert-butyl-4-hydroxylbenzyl)glutarate, diisooctyl alpha-(3,5-di-tert-butyl-4-hydroxylbenzyl)glutarate, and monomethyl-monoisooctyl alpha-(3,5-di-tert-butyl-4-hydroxylbenzyl)glutarate are produced.

What is claimed is:
1. A lubricating oil composition with improved oxidative performance, said composition comprising
   a) diisooctyl alpha-(3,5-di-tert-butyl-4-hydroxylbenzyl) glutarate, b) 2,6-di-tert-butylphenol and isooctyl 3,5-di-tert-butyl-4-hydroxyhydrocinnamate, and c) a base fluid, wherein the percent by weight of component a) to the total weight of component a) plus component b) is about 0.001 percent to about 99.999 percent.

2. A composition according to claim 1 in which the percent by weight of component a) to the total weight of component a) plus component b) is about 0.05 percent to about 90 percent.

3. A composition according to claim 2 in which the percent by weight of component a) to the total weight of component a) plus component b) is about 0.1 percent to about 50 percent.

4. A composition according to claim 3 in which the percent by weight of component a) to the total weight of component a) plus component b) is about 1 percent to about 10 percent.

5. A composition according to claim 1 in which the combination of component a) and component b) is present from about 0.01% to about 20% based on the weight of the total composition.

6. A composition according to claim 5 in which the combination of component a) and component b) is present from about 0.05% to about 15% based on the weight of the total composition.

7. A composition according to claim 6 in which the combination of component a) and component b) is present from about 0.2% to about 5% based on the weight of the total composition.

8. A composition according to claim 1 further comprising d) one or more compounds selected from the group consisting of other antioxidants, metal passivators, rust inhibitors, corrosion inhibitors, viscosity index improvers, extreme pressure agents, pour point depressants, solid lubricants, dispersants, detergents, antifoams, color stabilizers, further extreme pressure additives, demulsifiers, friction modifiers, and antiwear additives.

9. A method of improving oxidative performance in a lubricating oil composition comprising b) n-octadecyl 3,5-di-tert-butyl-4-hydroxyhydrocinnamate and 2,6-di-tert-butylphenol and c) a base fluid, which method comprises incorporating into said lubricating oil composition component a) according to claim 1.

10. An antioxidant composition comprising a) diisooctyl alpha-(3,5-di-tert-butyl-4-hydroxylbenzyl) glutarate, and b) 2,6-di-tert-butylphenol and isooctyl 3,5-di-tert-butyl-4-hydroxyhydrocinnamate, wherein the percent by weight of component a) to the total weight of component a) plus component b) is about 0.001 percent to about 99.999 percent.

11. A composition comprising a) diisooctyl alpha-(3,5-di-tert-butyl-4-hydroxylbenzyl) glutarate, b) 2,6-di-tert-butylphenol and isooctyl 3,5-di-tert-butyl-4-hydroxyhydrocinnamate, and e) one or more organic materials subject to the deleterious effects of oxidative, thermal, or light-induced degradation, wherein the percent by weight of component a) to the total weight of component a) plus component b) is about 0.001 percent to about 99.999 percent.

12. A composition according to claim 11 where component e) is a thermoplastic polymer.

13. A composition according to claim 11 where component e) is a polyolefin.

* * * * *